(12) United States Patent
Giordana

(10) Patent No.: US 8,313,240 B2
(45) Date of Patent: Nov. 20, 2012

(54) SENSORIZED BEARING UNIT

(75) Inventor: Davide Giordana, Turin (IT)

(73) Assignee: Aktiebolaget SKF, Göteborg (SE)

(*) Notice: Subject to any disclaimer, the term of this patent is extended or adjusted under 35 U.S.C. 154(b) by 628 days.

(21) Appl. No.: 12/450,121

(22) PCT Filed: Mar. 12, 2007

(86) PCT No.: PCT/EP2007/052275
§ 371 (c)(1),
(2), (4) Date: Sep. 11, 2009

(87) PCT Pub. No.: WO2008/110201
PCT Pub. Date: Sep. 18, 2008

(65) Prior Publication Data
US 2010/0074567 A1  Mar. 25, 2010

(51) Int. Cl.
*F16C 41/00* (2006.01)
(52) U.S. Cl. ........................................ 384/448
(58) Field of Classification Search .............. 384/448, 384/462, 476; 73/493, 514.31, 514.39; 324/207.25, 324/173, 174
See application file for complete search history.

(56) References Cited

U.S. PATENT DOCUMENTS

| | | | |
|---|---|---|---|
| 5,375,933 A * | 12/1994 | Mizutani et al. | 384/476 |
| 5,585,577 A | 12/1996 | Lemoine | |
| 6,142,673 A * | 11/2000 | Kottritsch et al. | 384/476 |
| 6,689,721 B2 * | 2/2004 | Denpo et al. | 508/100 |
| 2002/0054719 A1 | 5/2002 | Takizawa | |
| 2006/0257060 A1 | 11/2006 | Gempper et al. | |
| 2007/0277612 A1 | 12/2007 | Ehrfeld et al. | |

FOREIGN PATENT DOCUMENTS

| | | |
|---|---|---|
| EP | 0464403 A1 | 1/1992 |
| EP | 494446 A1 * | 7/1992 |
| EP | 0498298 A1 | 8/1992 |
| EP | 1624206 A1 | 2/2006 |
| JP | 121215 U | 12/1991 |
| JP | 2002139052 A | 5/2002 |
| JP | 2002206528 A | 7/2002 |
| JP | 2003206925 A | 7/2003 |
| JP | 2006518841 A | 8/2006 |
| JP | 2006526157 A | 11/2006 |

* cited by examiner

*Primary Examiner* — Phillip A Johnson
(74) *Attorney, Agent, or Firm* — Mark A. Ussai; Bryan Peckjian

(57) ABSTRACT

In a bearing unit (10), at least one sensor device (20, 21) is locked in a recess (16, 17) formed in a superficial zone of one of the races (11, 12). The stationary race (11) is partially covered with an electrically insulating material (30). An uncovered surface zone (32) is provided for electrically connecting the stationary race (11) to an electrical supply source located outside the bearing unit.

13 Claims, 3 Drawing Sheets

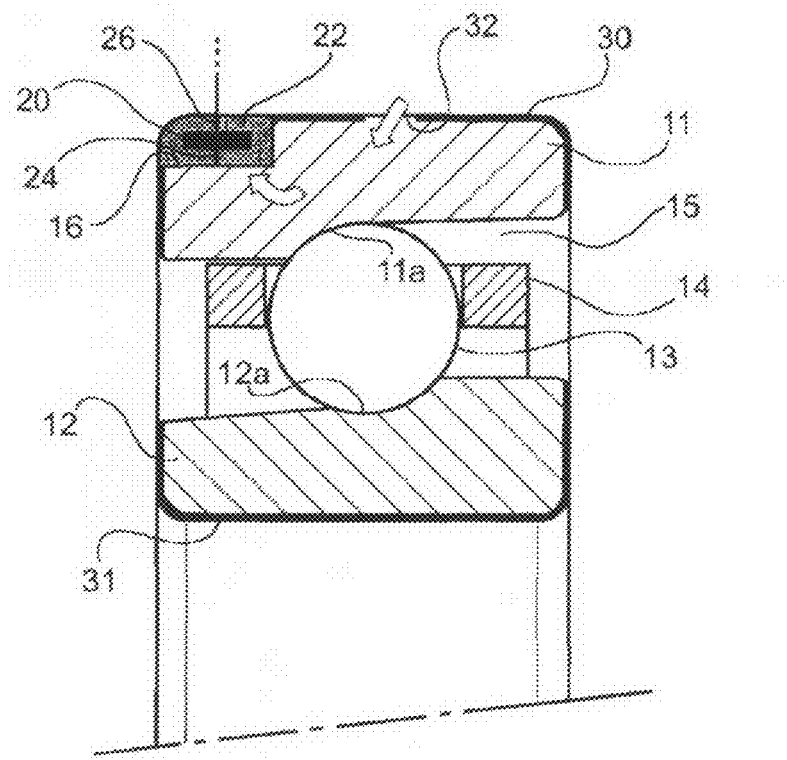

SENSORIZED BEARING UNIT

BACKGROUND OF THE INVENTION

The present invention refers to a bearing, and more particularly to a sensorized bearing unit.

There are known bearing units equipped with sensors in order to detect several important physical parameters in monitoring the operation of the bearing, such as rotation sensors, load sensors, temperature sensors, etc. Conventionally, these sensors are applied at a side of the bearing units, and need electrical connectors for supplying the sensors and transmit the data detected by these to a remotely located instrumentation. In some cases the sensors are incorporated in one of the sealing devices that laterally close the annular gap between the bearing races. However, the electrical connections protrude laterally from the bearing unit, causing problems of bulk in those applications where there is little space available. See, for example, EP 0 464 403 A1 and EP 0 498 298 A1.

U.S. Pat. No. 6,948,856 B2 discloses bearing units wherein sensors are located in grooves formed in the bearing races and embedded in resin so that the sensors do not protrude out of the bearing.

SUMMARY OF THE INVENTION

A general object of the invention is to provide a sensorized bearing unit of compact dimensions, capable of detecting accurately and reliably physical parameters indicative of the operating conditions of the unit. A specific object of the invention is to eliminate electrical connections protruding laterally from the bearing unit.

These and other objects and advantages, that will be better understood in the following, are accomplished according to the invention by a bearing unit having the features defined in the appended claims.

BRIEF DESCRIPTION OF THE SEVERAL VIEWS OF THE DRAWINGS

The structural and operational features of a few preferred but not limiting embodiments of a bearing unit bearing according to the invention will now be described making reference to the annexed drawings, in which:

FIGS. 4 and 5 are axial cross-sectional views, similar to that one of FIG. 2, of two further embodiments of the invention.

DETAILED DESCRIPTION OF THE INVENTION

Figure 1:
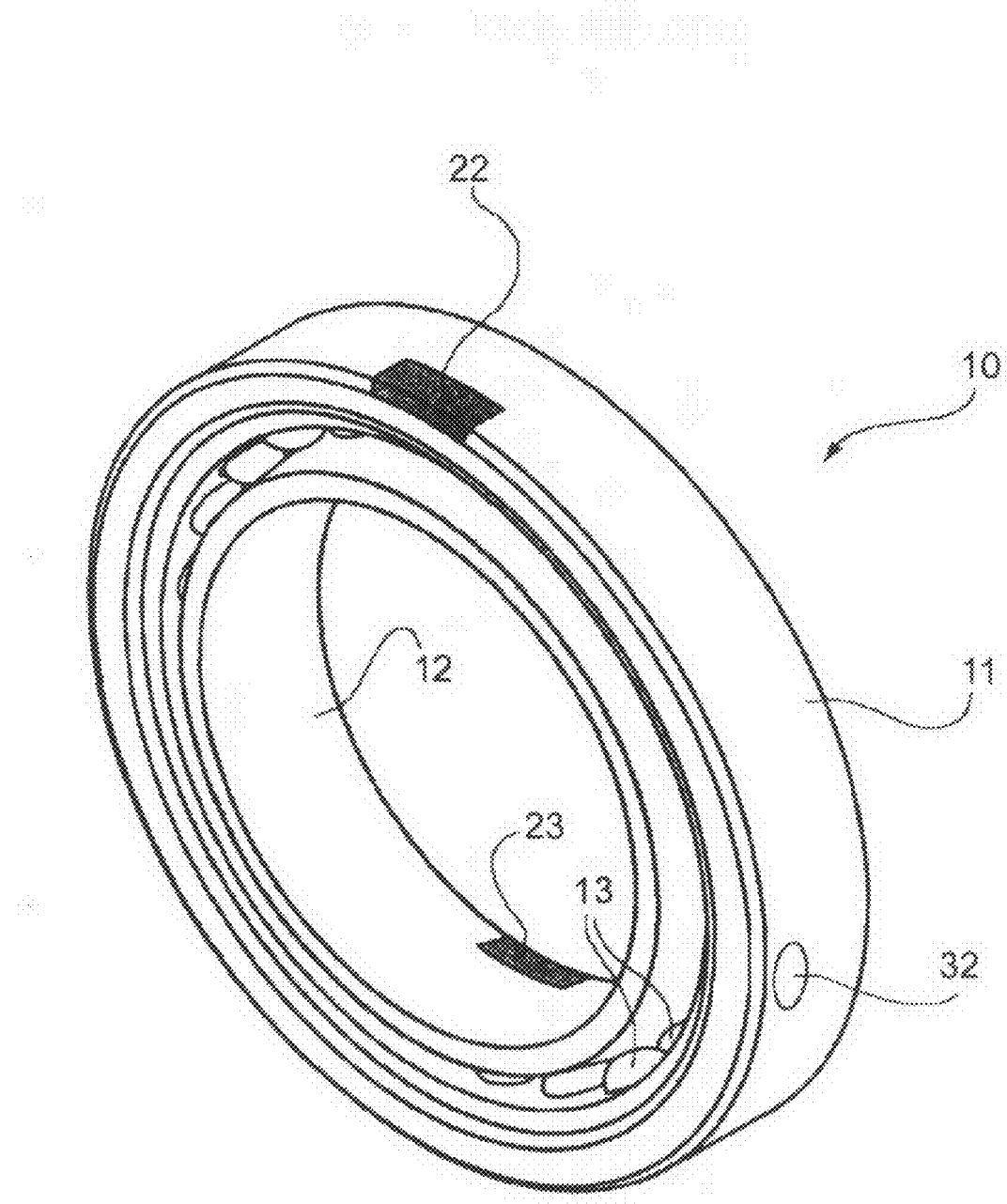
FIG. 1 is a perspective view of a first embodiment of a bearing unit according to the invention.
Figure 2:
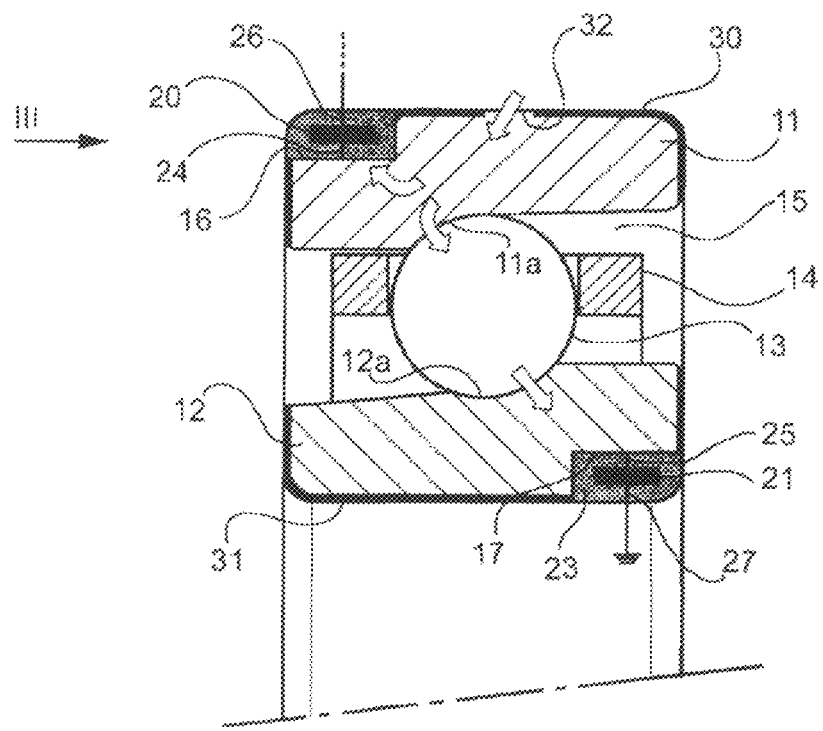
FIG. 2 is an axial cross-sectional view of the bearing unit of FIG. 1, with arrows indicating the paths followed by the electric signals.
Figure 3:
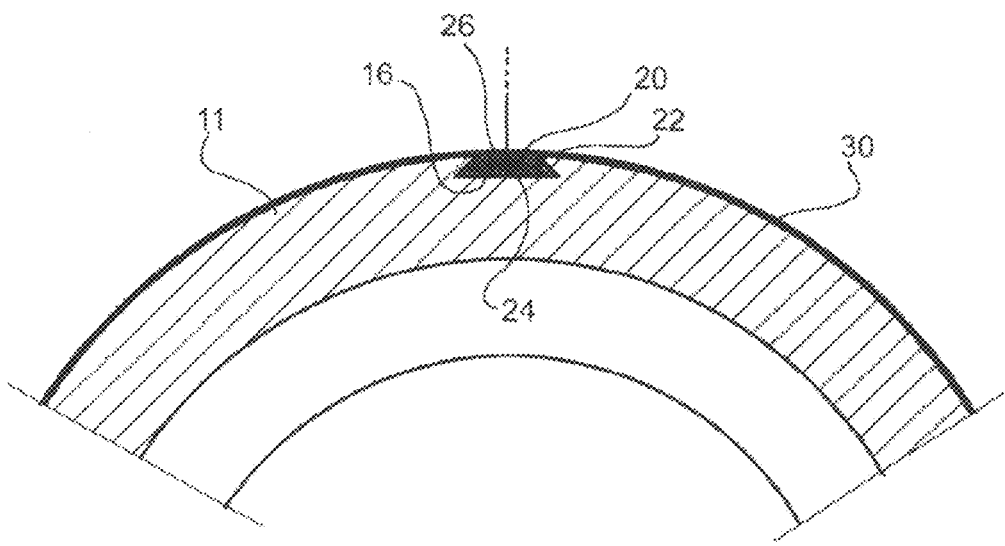
FIG. 3 is an enlarged view as seen in the direction of arrow III in FIG. 2.

Referring initially to FIGS. 1 and 2, indicated overall at 10 is a bearing with a stationary outer race 11 and an inner rotating race 12, respectively forming raceways 11a, 12a for a dual set of rolling elements, in this example balls 13, interposed between the races 11, 12 and circumferentially equally spaced by a cage 14. In order to retain the lubricating grease that normally fills up the annular gap 15 between races 11 and 12, sealing devices (not shown) can be mounted at the sides of the bearing. The bearing unit shown in the appended drawing is an angular contact bearing unit of the so-called type of the first generation, that is having axially asymmetric races with no radial flanges. However, the reference to this possible field of application must not be in any way interpreted as limiting of the scope of the patent. The invention could equally be applied for example to flanged bearings The bearing unit 10 incorporates one or more sensor devices, in this example two sensor devices 20, 21, integrated respectively in the outer race 11 and the inner race 12, in order to detect physical parameters useful in monitoring the operating conditions of the bearing unit. The sensor devices 20, 21 can comprise temperature sensors (for example thermistors), and/or vibration sensors (accelerometers), and/or load sensors (for example miniaturized load cells or miniaturized pressure transducers or piezoelectric transducers), and/or rotation sensors, for example magnetic sensors or pressure sensors capable of detecting variations of the magnetic field or pressure variations as the balls or rollers 13 pass by.

The sensor devices 20, 21 are preferably accommodated in respective radial recesses 16, 17 obtained in races 11, 12 by means of machining in superficial or peripheral positions of the radial cross-section of the bearing unit, and preferably far from the raceways 11a, 12a. The sensor devices are embedded in respective bodies of resin or plastic material 22, 23 so as to be steadily held on the respective races. Each sensor device is connected electrically at 24, 25 to the respective race and has an output electrical connection 26 for connecting to an external receiver (not shown) and an output electrical connection 27 for bonding to a central shaft (not illustrated) on which the inner race 12 is rotationally locked.

Direct electrical contact between the outer surfaces of races 11, 12 and the other mechanical members (outer housing, central shaft, etc) associated with the bearing unit 10 is prevented by layers 30, 31 of insulating material, except for an uncovered electrical supply area 32 on one of the outer surfaces of the outer race 11. The cover layers 30, 31 can for example be made of a material available on the market under the trade name INSOCOAT®, comprising alumina ($Al_2O_3$) and having one thickness of approximately 100 microns.

The supply area 32 is suitable for being electrically connected to an electrical supply means (for example a probe, not illustrated) that supplies current to the outer sensor device 20 through the body of outer race 11, and to inner sensor device 21 through the outer race 11, the rolling elements 13 and the body of inner race 12. To this end, at least one of the rolling elements must be electrically conductive. As an alternative, if for example the rolling elements 13 are all coated or completely made of a non-conductive material (typically a ceramic material), the grease within the annular gap 15 will have to be electrically conductive, for example of the kind known as Kluberelectric B42-72, so as to form a conductive film around the rolling elements 13.

Should the bearing unit comprises contacting seals for retaining the lubricant inside the bearing unit and preventing water and dirt from penetrating inside the unit, these seals could advantageously be suitable for electrically connecting the stationary bearing race to the rotatable bearing race.

Differently from what is shown in FIG. 1, where the supply area 32 is depicted as a spot, the shape and extent of that area may vary considerably, according to requirements. It may, for example, be shaped as an uncovered strip extending circumferentially and continuously around the outer bearing race.

The signals generated by the sensor devices 20, 21 and indicative of the detected data (of temperature, vibration, rotation, etc.) modulate the feeding voltage arriving to the uncovered supply area 32. Voltage variations are detected by an external instrumentation (not illustrated) connected to the supply, so as to easily acquire the data detected by the sensors. Alternatively or additionally, modulation may be carried out on the signals current. Current modulation should advantageously reduce noise on the signals.

The sensor devices 20, 21 can incorporate electronic components such as a microprocessor for processing data generated by the various transducers. Any of these sensor devices could also be associated with or incorporate a transmitter for wireless transmission of the detected and possibly processed data to a receiver located outside the bearing unit.

In order to avoid electrical erosion of those parts of the bearing through which the current passes, preferably the electric supply is to low intensity and frequency; this will not be required if an electrically conductive grease is used.

The electrically insulating layers 30, 31 serve to assure that the feeding current effectively arrives to the sensor devices, and to avoid therefore that the current is dispersed directly in the external housing or in the central shaft, bypassing the sensor devices.

In the example illustrated in FIG. 2 it is shown that the insulating layers cover also part of the side surfaces of the races 11, 12. This arrangement avoids that the supply current passing through the bearing races may leak through other members or bodies located at a side of the bearing unit 10, for example spacer rings and/or other conventional bearing units lacking electrically insulating layers as those of FIG. 2.

Shown in FIG. 4 is an alternative embodiment of the invention, having no sensor device incorporated in the rotating race 12.

The variant shown in FIG. 5 does not provide a sensor device incorporated in stationary race 11. The sensor device 21 fixed in the rotating race 12 is fed through races 11 and 12 and balls 13 or an electrically conductive grease.

As will be appreciated, the current supply through the bearing races, in accordance with the present invention, provides a sensorized bearing unit having a substantially identical external profile to that of a conventional, non-sensorized bearing unit. The absence of the traditional electrical connectors projecting at the sides of the bearing allows to mount a bearing unit according to the invention without problems of axial bulk. In a machine tool, for example, a bearing unit of the type illustrated in the figures will be able to replace a conventional, non-sensorized bearing unit of equal size without requiring any modification to the arrangement of other fixed or mobile parts of the machine.

Moreover, it will be appreciated that the invention allows to rigidly fix various types of sensor devices to the races of a bearing unit, which improves accuracy of the detected data, especially with vibration sensors and temperature sensors. Above all, with high precision bearings the difference in temperature between the outer race and the inner race represents a parameter of primary importance in the monitoring of the operating conditions. The invention allows to directly detect the temperatures of the two races. Regardless of the type of sensor, the rigid locking guarantees the correct positioning of the sensor with time, and therefore the reliability of the detected data. This turns out to be particularly useful for bearing units mounted on parts subjected to hits, as for example is the case of bearings for the hub of a vehicle wheel.

The invention is not limited to the embodiments described and illustrated herein, that are to be considered as examples of the bearing unit. Rather, the invention is susceptible of modifications concerning the shape and location of parts, constructional ad operational details, as will be apparent to those skilled in the art. For example, several recesses may be formed on a same race for accommodating several sensors. Still further, the invention may be implemented with bearing units having sensors mounted on outer surfaces of the bearing races, rather than embedded in recesses, as shown in the preferred embodiments.

The invention claimed is:

1. A bearing unit comprising;
    a stationary race forming a raceway and being partially covered with an electrically insulating material,
    a rotating race forming a raceway,
    a plurality of rolling elements interposed between the races stationary and rotating raceways, and
    at least one sensor device secured to one of the stationary race and the rotating race, and
    an electrical connection for electrically connecting the stationary race to an electrical supply source located outside the bearing unit, and wherein
    the electrical connection is a first electrical connection and the bearing unit further comprises a second electrical connection for electrically connecting the sensor device to one of the stationary race and the rotating race.

2. The bearing unit according to claim 1, wherein the sensor device is disposed in at least one recess formed in a peripheral area of at least one of the stationary race and the rotating race.

3. The bearing unit according to claim 2, wherein the sensor device is disposed in a recess formed in a peripheral area of the stationary outer race.

4. The bearing unit according to claim 2, wherein the sensor device is disposed in a recess formed in a peripheral area of the rotating race, the rotating race is electrically connected to the stationary race by at least one of the rolling elements and an electrically conductive grease contained in an annular gap defined between the stationary race and the rotating race, and the rotating race is partially coated with a layer of electrically insulating material.

5. The bearing unit according to claim 2, wherein the sensor device is embedded in a body made of one of resin material and plastic material, the body being located within the recess.

6. The bearing unit according to claim 1, further comprising a third electrical connection for electrically connecting the sensor device to a body or device outside the bearing unit.

7. The bearing unit according to claim 6, wherein the at least one sensor device includes two sensor devices, one of the two sensor devices being disposed in a recess of the stationary race and the other one of the two sensor devices is disposed in a recess of the rotating race, the stationary race and the rotating race are both partially coated with respective layers of electrically conductive material and each of the two sensor devices is connected to a separate second electrical connection for electrically connecting each sensor device to the one of the stationary and rotating races to which the sensor device is secured, and each of the two sensor devices is further connected to a separate third electrical connection for electrically connecting each sensor device to a body or device outside the bearing unit.

8. The bearing unit according to claim 7, wherein the recesses are formed in each race in peripheral areas distal from the raceways.

9. The bearing unit according to claim 6, wherein the first electrical connection and the third electrical connection are each located on cylindrical surfaces of the bearing unit coaxial with respect to a central axis of rotation of the bearing unit.

10. The bearing unit according to claim 1, wherein the at least one sensor device includes at least one of a temperature sensor, a vibration sensor, a load sensor, a load cell, a pressure transducer, and a magnetic rotation sensor.

11. The bearing unit according to claim 1, wherein the electrical connection includes a peripheral area of the stationary race uncovered by the electrically insulating material.

12. The bearing unit according to claim 11, wherein the uncovered area of the stationary race is a spot.

13. The bearing unit according to claim 11, wherein the uncovered area of the stationary race is shaped as a strip extending circumferentially along the stationary race.

* * * * *